United States Patent
Bala

(10) Patent No.: US 12,368,526 B2
(45) Date of Patent: Jul. 22, 2025

(54) METHOD AND APPARATUS FOR DOWNLINK MULTI-USER WITH DFT-S-OFDM WAVEFORM

(71) Applicant: Rakuten Symphony, Inc., Tokyo (JP)

(72) Inventor: Erdem Bala, San Mateo, CA (US)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/012,118

(22) PCT Filed: Oct. 17, 2022

(86) PCT No.: PCT/US2022/046836
§ 371 (c)(1),
(2) Date: Dec. 21, 2022

(87) PCT Pub. No.: WO2024/025572
PCT Pub. Date: Feb. 1, 2024

(65) Prior Publication Data
US 2024/0250769 A1     Jul. 25, 2024

Related U.S. Application Data

(60) Provisional application No. 63/393,475, filed on Jul. 29, 2022.

(51) Int. Cl.
*H04J 14/02* (2006.01)
*H04B 10/60* (2013.01)
(Continued)

(52) U.S. Cl.
CPC .... *H04J 14/02764* (2023.08); *H04J 14/0298* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 7,720,175 B2* | 5/2010 | Yeon | .................. | H04L 27/2624 375/296 |
| 2009/0257757 A1* | 10/2009 | Wan | ..................... | H04J 14/0298 398/202 |

(Continued)

OTHER PUBLICATIONS

Selvi, "The performance of orthogonal frequency division multiplexing in the weak turbulence regime of free space optics communication systems", Oct. 2012, IOP Publishing, Journal of Optics, J. Opt. 14 (2012) 125401 (6pp), doi: 10.1088/2040-8978/14/12/125401 (Year: 2012).*

(Continued)

*Primary Examiner* — Darren E Wolf
(74) *Attorney, Agent, or Firm* — Sughrue Mion, PLLC

(57) ABSTRACT

A method performed by at least one processor of a network node operating in a wireless communication network includes receiving data associated with a plurality of users. The method further includes performing, by a discrete Fourier transform (DFT) coder, a DFT transformation on the data associated with the plurality of users. The method further includes performing, on the output of the DFT coder by a subcarrier mapper, subcarrier mapping that maps the output of the DFT coder to a set of subcarriers. The method further includes performing an inverse DFT (IDFT) on the output of the subcarrier mapper. The method further includes transmitting, over the wireless communication network, the output of the IDFT as a DFT spread optical frequency division multiplexing (DFT-s-OFDM) signal.

18 Claims, 8 Drawing Sheets

(51) Int. Cl.
  *H04B 10/40* (2013.01)
  *H04B 10/50* (2013.01)

(56) References Cited

U.S. PATENT DOCUMENTS

| | | | | |
|---|---|---|---|---|
| 2009/0297144 | A1* | 12/2009 | Djordevic | H04L 1/0656 |
| | | | | 398/202 |
| 2010/0247099 | A1* | 9/2010 | Lowery | H04L 27/367 |
| | | | | 398/79 |
| 2011/0229130 | A1* | 9/2011 | Yokoi | H04B 10/116 |
| | | | | 398/43 |
| 2011/0318021 | A1* | 12/2011 | Zhou | H04L 27/0014 |
| | | | | 375/376 |
| 2012/0099865 | A1* | 4/2012 | Ishii | H04L 25/03159 |
| | | | | 398/136 |
| 2012/0224866 | A1* | 9/2012 | Gaete | H04B 10/27 |
| | | | | 398/186 |
| 2012/0269510 | A1* | 10/2012 | Hui | H04J 14/0257 |
| | | | | 398/79 |
| 2012/0294616 | A1* | 11/2012 | Sasaki | H04B 10/548 |
| | | | | 398/79 |
| 2013/0148971 | A1* | 6/2013 | Yu | H04L 27/2613 |
| | | | | 398/79 |
| 2022/0078765 | A1 | 3/2022 | Kim et al. | |

OTHER PUBLICATIONS

International Search Report dated Feb. 2, 2023 issued in International Application No. PCT/US2022/046836.
Written Opinion dated Feb. 2, 2023 issued in International Application No. PCT/US2022/046836.

* cited by examiner

METHOD AND APPARATUS FOR DOWNLINK MULTI-USER WITH DFT-S-OFDM WAVEFORM

CROSS-REFERENCE TO RELATED APPLICATION(S)

This application is a National Stage of International Application No. PCT/US2022/046836 filed Oct. 17, 2022, which is based on and claims priority to U.S. Patent Application No. 63/393,475, filed on Jul. 29, 2022, the disclosure of which is incorporated herein by reference in its entirety.

TECHNICAL FIELD

The present disclosure relates generally to communication systems, and more particularly to methods and apparatuses for downlink multi-user with DFT-s-OFDM waveform.

BACKGROUND

Discrete Fourier Transform (DFT) spread optical frequency division multiplexing (DFT-s-OFDM) is a variation of OFDM in which data symbols are subject to DFT precoding before mapping to allocated subcarriers. DFT-s-OFDM is used in the uplink of 5G NR (38.211) and LTE (36.211). In the downlink, only OFDM is used. From a UE's perspective, in the uplink direction, all data symbols in one DFT-s-OFDM symbol are transmitted to a single receiver (e.g., the gNB). However, in the downlink direction, the gNB schedules data symbols to multiple users in one DFT-symbol.

The biggest advantage of DFT-s-OFDM over OFDM is a lower peak-to-average power ratio (PAPR) using DFT-s-OFDM. Lower PAPR results in higher energy efficiency because the power amplifier may be operated in the linear region. Therefore, DFT-s-OFDM is likely to be considered for downlink transmission in 5G+ or 6G communications, especially for higher carrier frequencies. To preserve low PAPR, one DFT block is generally used, and the signal at the output of the DFT block before mapping to the subcarriers is not disturbed. When DFT-s-OFDM is used, multiple users may be multiplexed in the time domain, over multiple DFT-s-OFDM symbols. Particularly, DFT-s-OFDM restricts scheduling a single user over one DFT-s-OFDM symbol. This restriction reduces scheduling efficiency.

Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for downlink multi-user with DFT-s-OFDM waveform are disclosed by the present disclosure.

According to an exemplary embodiment, a method performed by at least one processor of a network node operating in a wireless communication network includes receiving data associated with a plurality of users. The method further includes performing, by a discrete Fourier transform (DFT) coder, a DFT transformation on the data associated with the plurality of users. The method further includes performing, on the output of the DFT coder by a subcarrier mapper, subcarrier mapping that maps the output of the DFT coder to a set of subcarriers. The method further includes performing an inverse DFT (IDFT) on the output of the subcarrier mapper. The method further includes transmitting, over the wireless communication network, the output of the IDFT as a DFT spread optical frequency division multiplexing (DFT-s-OFDM) signal.

According to an exemplary embodiment, a network node operating in a wireless communication network, includes at least one memory configured to store computer program code, and at least one processor configured to access said at least one memory and operate as instructed by said computer program code. The computer program code includes receiving code configured to cause the at least one processor to receive data associated with a plurality of users. The computer program code further includes first performing code configured to cause the at least one processor to perform, by a discrete Fourier transform (DFT) coder, a DFT transformation on the data associated with the plurality of users. The computer program code further includes second performing code configured to cause the at least one processor to perform, on the output of the DFT coder by a subcarrier mapper, subcarrier mapping that maps the output of the DFT coder to a set of subcarriers. The computer program code further includes third performing code configured to cause the at least one processor to perform an inverse DFT (IDFT) on the output of the subcarrier mapper. The computer program code further includes transmitting code configured to cause the at least one processor to transmit, over the wireless communication network, the output of the IDFT as a DFT spread optical frequency division multiplexing (DFT-s-OFDM) signal.

According to an exemplary embodiment, a non-transitory computer readable medium having instructions stored therein, which when executed by a processor in a network node operating in a wireless communication network cause the network node to execute a method including receiving data associated with a plurality of users. The method further includes performing, by a discrete Fourier transform (DFT) coder, a DFT transformation on the data associated with the plurality of users. The method further includes performing, on the output of the DFT coder by a subcarrier mapper, subcarrier mapping that maps the output of the DFT coder to a set of subcarriers. The method further includes performing an inverse DFT (IDFT) on the output of the subcarrier mapper. The method further includes transmitting, over the wireless communication network, the output of the IDFT as a DFT spread optical frequency division multiplexing (DFT-s-OFDM) signal.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

Figure 1:
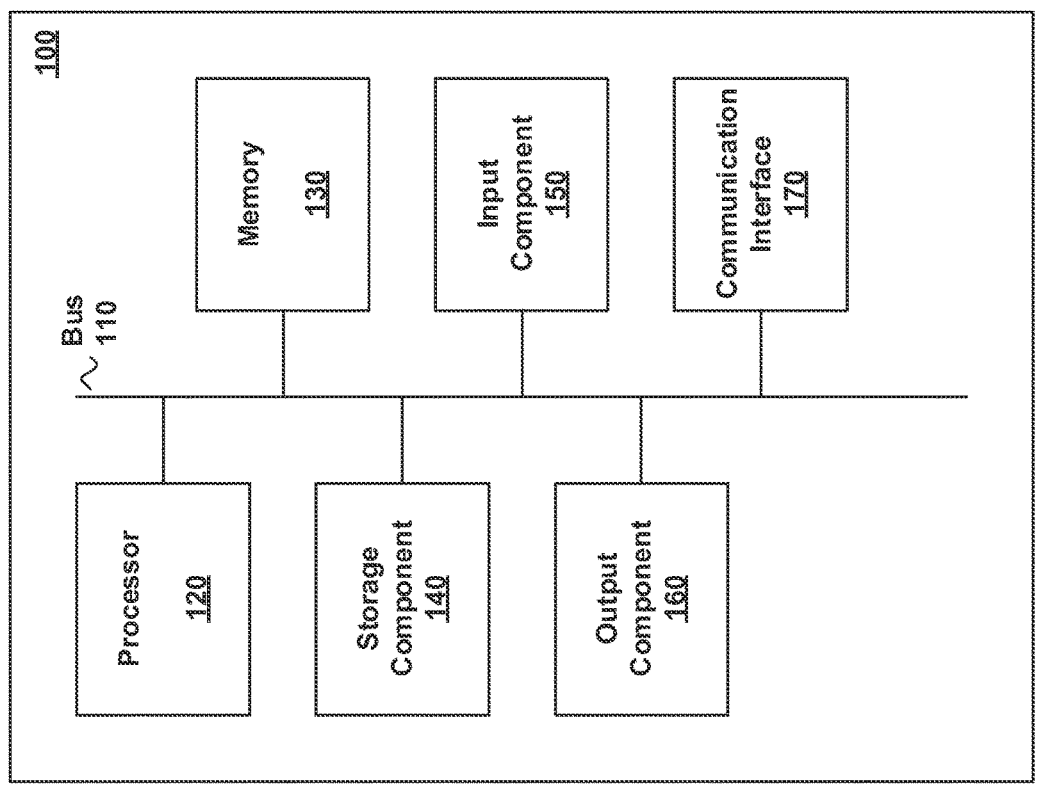
FIG. 1 is a diagram of an example network device in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Embodiments of the present disclosure are directed to multiplexing data symbols targeting multiple users before a DFT precoder. The embodiments of the present disclosure provide the significantly advantageous features of keeping PAPR low while enabling multi-user scheduling in one DFT-s-OFDM symbol. The embodiments of the present disclosure also provide higher energy efficiency as well as multi-user scheduling flexibility resulting in higher throughput and/or spectral efficiency.

Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general-purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170).

The device 100 may further comprise the memory 130. In some embodiments, the memory 130 may comprise a random-access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively, or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be affected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively, or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively, or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of (one or more) components shown in FIG. 1 may perform one or more functions described as being performed by another set of components shown in FIG. 1.

Figure 2:
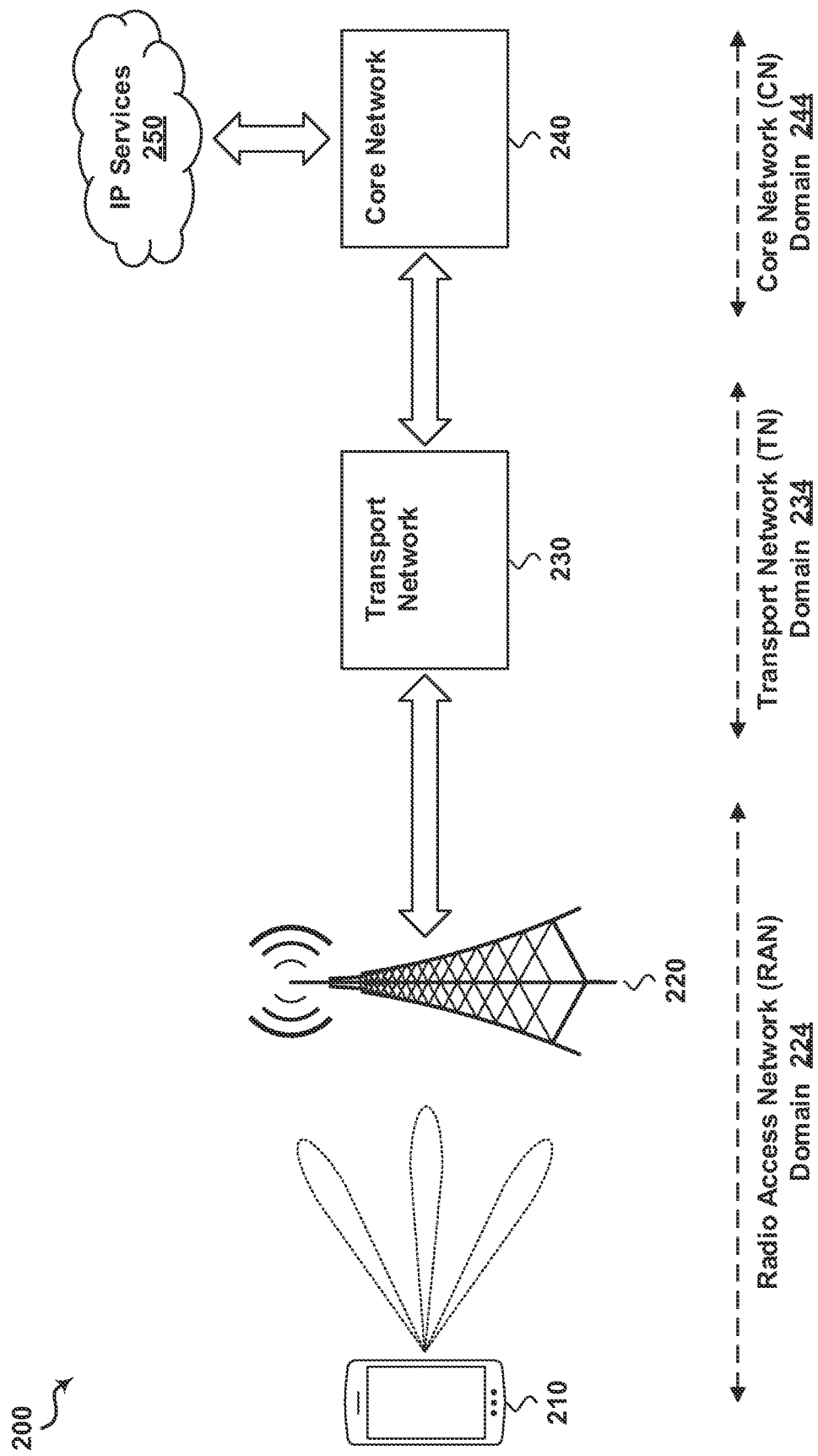
FIG. 2 is a schematic diagram of an example wireless communications system, in accordance with various embodiments of the present disclosure.

FIG. 2 is a diagram illustrating an example of a wireless communications system, according to various embodiments of the present disclosure. The wireless communications system 200 (which may also be referred to as a wireless wide area network (WWAN)) may include one or more user equipment (UE) 210, one or more base stations 220, at least one transport network 230, and at least one core network 240. The device 100 (FIG. 1) may be incorporated in the UE 210 or the base station 220.

The one or more UEs 210 may access the at least one core network 240 and/or IP services 250 via a connection to the one or more base stations 220 over a RAN domain 224 and through the at least one transport network 230. Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IOT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220 may wirelessly communicate with the one or more UEs 210 over the RAN domain 224. Each base station of the one or more base stations 220 may provide communication coverage to one or more UEs 210 located within a geographic coverage area of that base station 220. In some embodiments, as shown in FIG. 2, the base station 220 may transmit one or more beamformed signals to the one or more UEs 210 in one or more transmit directions. The one or more UEs 210 may receive the beamformed signals from the base station 220 in one or more receive directions. Alternatively, or additionally, the one or more UEs 210 may transmit beamformed signals to the base station 220 in one or more transmit directions. The base station 220 may receive the beamformed signals from the one or more UEs 210 in one or more receive directions.

The one or more base stations 220 may include macrocells (e.g., high power cellular base stations) and/or small cells (e.g., low power cellular base stations). The small cells may include femtocells, picocells, and microcells. A base station 220, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

The one or more base stations 220 may be configured to interface (e.g., establish connections, transfer data, and the like) with the at least one core network 240 through at least one transport network 230. In addition to other functions, the one or more base stations 220 may perform one or more of the following functions: transfer of data received from the one or more UEs 210 (e.g., uplink data) to the at least one core network 240 via the at least one transport network 230, transfer of data received from the at least one core network 240 (e.g., downlink data) via the at least one transport network 230 to the one or more UEs 210.

The transport network 230 may transfer data (e.g., uplink data, downlink data) and/or signaling between the RAN domain 224 and the CN domain 244. For example, the transport network 230 may provide one or more backhaul links between the one or more base stations 220 and the at least one core network 240. The backhaul links may be wired or wireless.

The core network 240 may be configured to provide one or more services (e.g., enhanced mobile broadband (eMBB), ultra-reliable low-latency communications (URLLC), and massive machine type communications (mMTC), etc.) to the one or more UEs 210 connected to the RAN domain 224 via the TN domain 234. Alternatively, or additionally, the core network 240 may serve as an entry point for the IP services 250. The IP services 250 may include the Internet, an intranet, an IP multimedia subsystem (IMS), a streaming service (e.g., video, audio, gaming, etc.), and/or other IP services.

Figure 3:
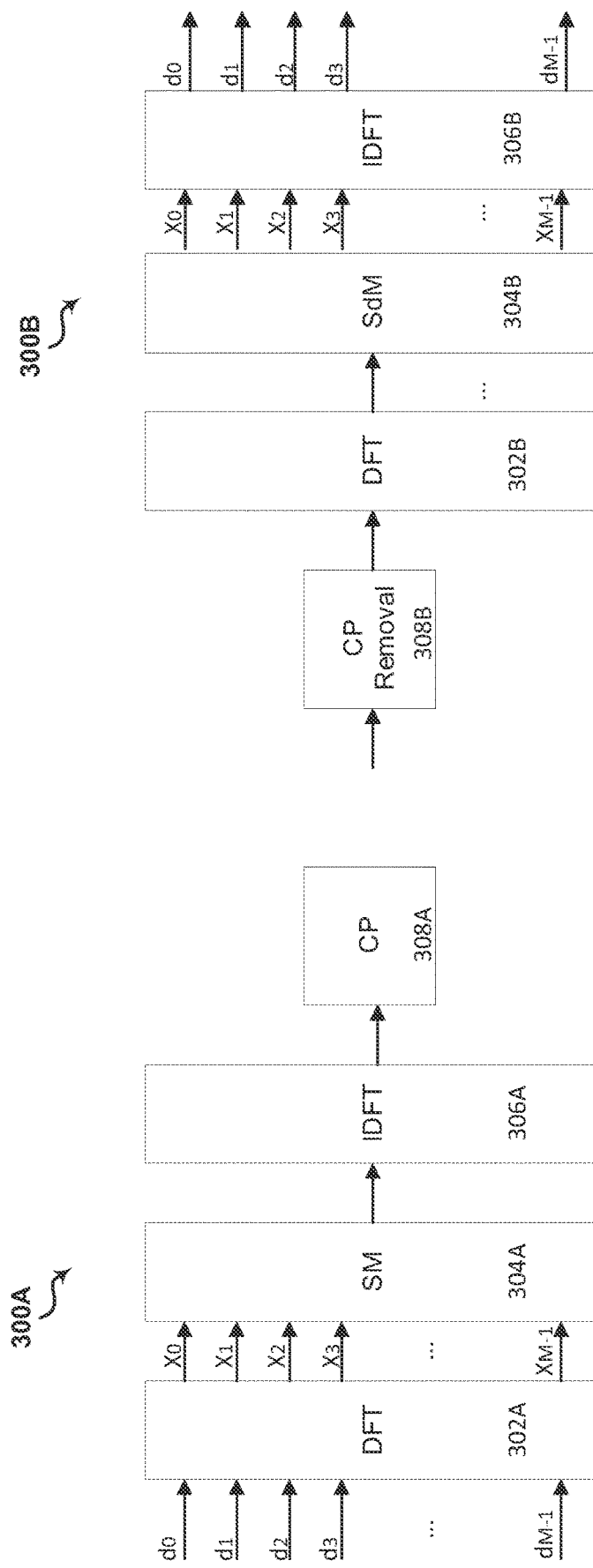
FIG. 3 is an example DFT-s-OFDM transceiver, in accordance with various embodiments of the present disclosure.

FIG. 3 illustrates an embodiment of a baseband block diagram of a DFT-s-OFDM transceiver. The transceiver may include transmitting circuitry 300A and receiving circuitry 300B. The transmitting circuitry 300A and receiving circuitry 300B may be located in separate network nodes. For example, the transmitting circuitry 300A may be included in a first base station while the receiving circuitry 300B may be included in a second base station or in another UE. The transmitting circuitry 300A may include a DFT precoder 302A that performs a DFT operation on M data symbols $d_0, \ldots, d_{M-1}$. The data symbols may be user data of multiple users, control data, or a combination of both. The output of the DFT precoder 302A may subsequently be input to a subcarrier mapper (SM) 304A, which may map the DFT output to a set of subcarriers. The output of the SM 304A may be provided to an IDFT 306A, and subsequently provided to CP 308A for addition of a cyclic prefix (CP). After addition of the CP, DFT-s-OFDM signal may be further processed and transmitted. The size of the IDFT block may be larger than M.

At the receiver 300B, first the CP is removed by CP Removal 308B, and the DFT is performed on the received signal by DFT 302B. A subcarrier de-mapper (SdM) 304B may select M outputs of the DFT that correspond to the used subcarriers. The selected outputs may be processed subsequently by an IDFT block 306B. Both the transmitting circuitry 300A and receiving circuitry may include additional blocks such as an equalizer, channel estimator, etc. When there is channel and/or noise, the symbols at the output of the IDFT block at the receiver may be an estimate of the transmitted symbols.

In some embodiments, data symbols may be transmitted to more than one target receiver in one DFT-s-OFDM symbol. The data symbols targeting separate users may be multiplexed before the DFT precoder at the transmitter such as DFT precoder 402 of the transmitter 400 in FIG. 4, or the DFT precoder 502 of transmitter 500 in FIG. 5. In this example, data symbols $d_0, \ldots, d_{M-1}$ may be data symbols scheduled for more than one user. The data symbols for separate users may be multiplexed in accordance with various embodiments.

In some embodiments, the data symbols for a user may be mapped to a contiguous set of DFT inputs (e.g., a contiguous set of DFT inputs may be allocated to that user). For example, in FIG. 4, symbols belonging to UE1 are mapped to DFT inputs 0 to N-1, symbols belonging to UE2 are mapped to DFT inputs N to K-1, symbols belonging to UE3 are mapped to DFT inputs K to M-1.

In some embodiments, a set of non-contiguous DFT inputs may be allocated to a user. The DFT inputs may be divided into L blocks where the inputs in each block may be consecutive. For example, block 1 may include DFT inputs {0 to 11}, block 2 may include DFT inputs {12 to 24}, etc. Subsequently, one or more of the L blocks may be allocated to data symbols of a user. For example, in FIG. 5, the DFT inputs are divided into 6 blocks: bl 1 to bl 6. Data symbols for UE1 may be mapped to blocks 1, 3, 5, and data symbols for UE2 may be mapped to blocks 2, 4, and 6.

In some embodiments, the receiver may need to know the resource allocation to be able to separate the UE's own data symbols at the output of the IDFT block at the receiver. Resource allocation may include indices of the DFT inputs to which the data symbols are mapped, the subcarriers, the indices of the DFT-s-OFDM symbols that have user data, the indices of the slots, etc. Resource allocation, including the DFT inputs used for a specific user, may be transmitted to the UE in control information and/or may be configured.

Figure 4:
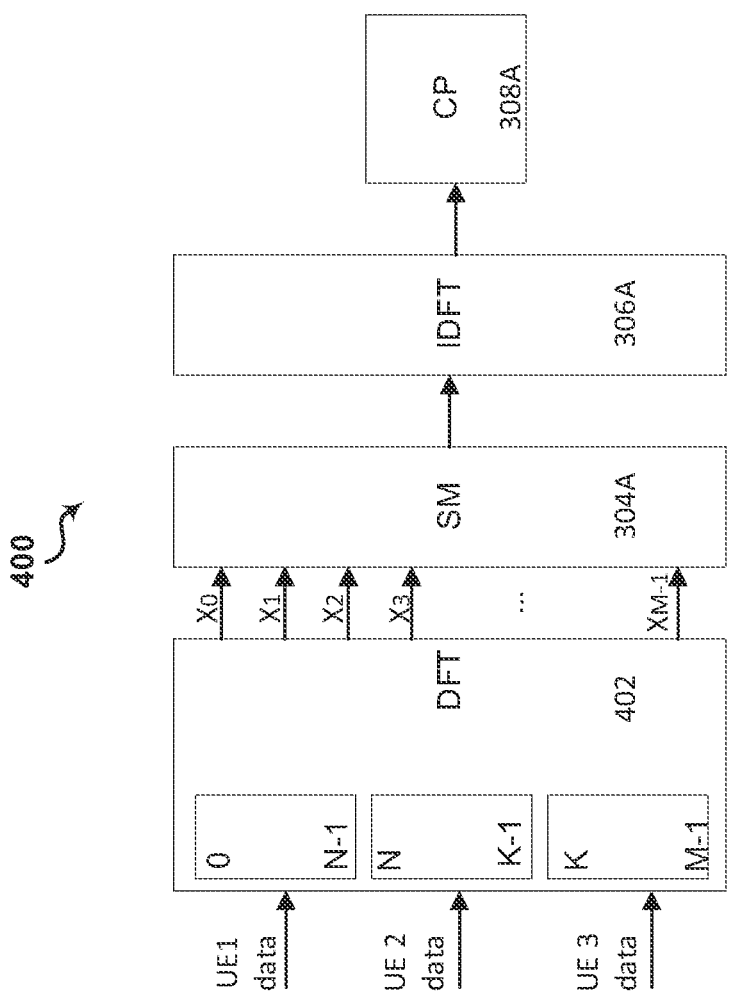
FIG. 4 is an example DFT-s-OFDM transmitter, in accordance with various embodiments of the present disclosure.
Figure 5:
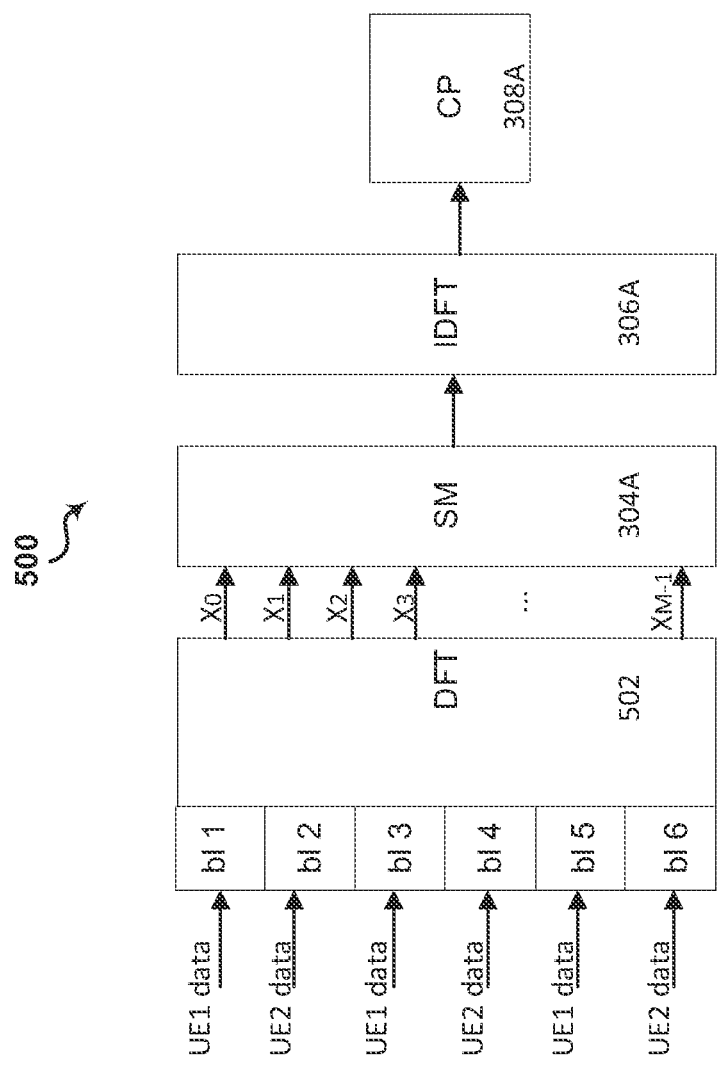
FIG. 5 is an example DFT-s-OFDM transmitter, in accordance with various embodiments of the present disclosure.

For contiguous mapping, as shown in FIG. 4, the control information may contain the index of the first allocated DFT input and the total number of allocated DFT inputs. For distributed mapping, the control information may contain a bitmap of length L (e.g., L is the number of blocks) where a bit in the bitmap may indicate if the corresponding block of inputs is allocated to a user. Bit 1 may indicate that a block is allocated to the user and bit 0 may mean that the block is not allocated to the user. For example, for FIG. 5, the Bitmap may contain 6 bits and the resource allocation for UE1 may be indicated with [1 0 1 0 1 0] and the resource allocation for UE2 may be indicated with [0 1 0 1 0 1]. At least one of the number of blocks and the number of DFT inputs per block may be configured. The UE may determine the size of the DFT from the number of allocated subcarriers.

Figure 6:
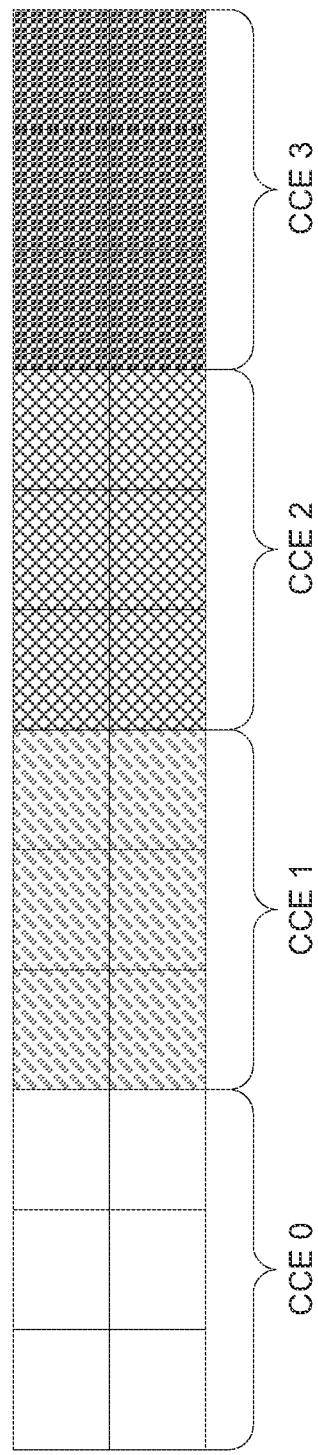
FIG. 6 illustrates an example CCE mapping to pre-DFT resource blocks, in accordance with various embodiments of the present disclosure.
Figure 7:
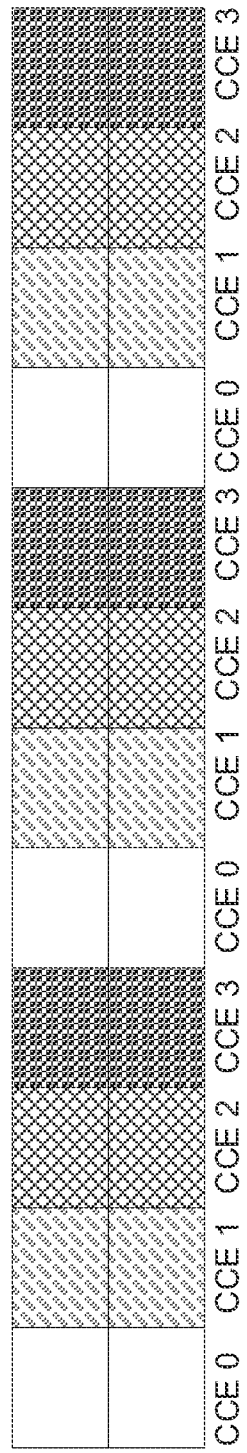
FIG. 7 illustrates an example CCE mapping to pre-DFT resource blocks, in accordance with various embodiments of the present disclosure.

In some embodiments, the PDCCH may also be mapped to the DFT inputs. PDCCH may include one or more control channel elements (CCEs). Each CCE may include a certain number of resources (e.g., 72 resources). Each DFT input on one DFT-s-OFDM symbol may be counted as one resource. As an example, one CCE may include 72 resources (DFT inputs) in one DFT-s-OFDM symbol. In another example, 72 resources for a CCE may be divided equally over 3 DFT-s-OFDM symbols. FIGS. 6 and 7 illustrate examples of CCE to resource mapping. In these figures, as an example, each box denotes 12 DFT inputs over one DFT-s-OFDM symbol. In FIG. 6, the CCEs include contiguous resources, and in FIG. 7, the CCEs include distributed resources. In these figures, the x-axis may represent the input to the DFT in one DFT-s-OFDM symbol and the y-axis may represent the indices of DFT-s-OFDM symbols used for PDCCH. For example, in these figures, 36 resources of each CCE may be transmitted in one DFT-s-OFDM symbol and the remaining 36 resources may be transmitted in a following DFT-s-OFDM symbol. The number of DFT-s-OFDM symbols to transmit all of the CCEs may be 1 or 2 or 3, or more.

The PDCCH may be mapped to one or more CCEs. In some embodiments, if the receiver does not know exactly which CCEs are used to carry the PDCCH, the receiver may blindly decode PDCCH candidates. At the receiver, the resources to be used to form the PDCCH candidates may be after the IDFT block.

Figure 8:
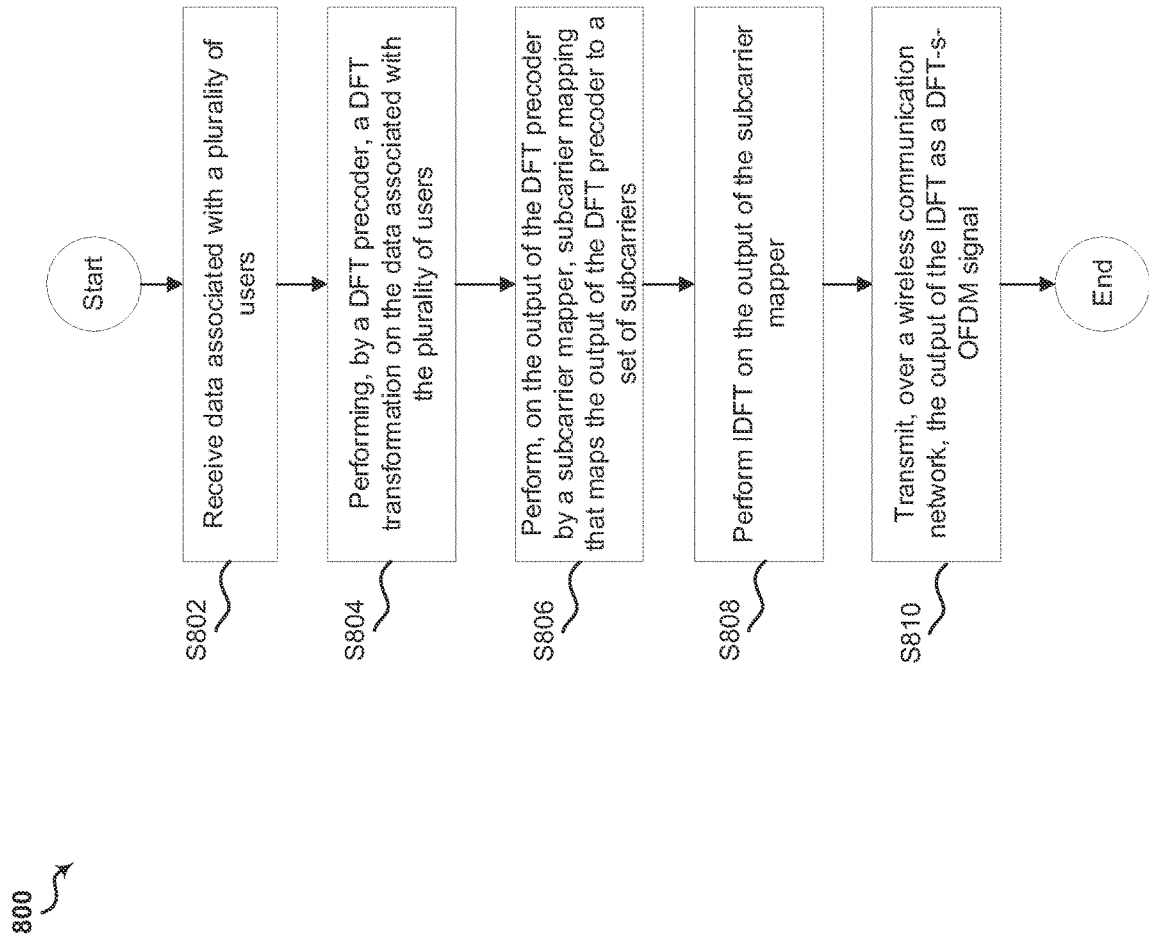
FIG. 8 illustrates an example flow chart of an embodiment of a process of multiplexing data of multiple users on a DFT-s-OFDM signal.

FIG. 8 illustrates a flowchart of an embodiment of a process 800 of multiplexing data of multiple users on a DFT-s-OFDM signal. The process 800 may be performed by any network node (e.g., base station 220) having transmitting circuitry such as the circuitry illustrated in FIGS. 3-5. The process may start at operation S802 where data associated with a plurality of users is received. The process may proceed to operation S804 where a DFT transformation is performed, by a DFT precoder, on the data associated with the plurality of users. The DFT precoder may correspond to any one of DFT precoders 302A, 402, and 502. The process proceeds to operation S806 where subcarrier mapping is performed, by a subcarrier mapper, on the output of the DFT precoder. The subcarrier mapper may map the output of the DFT precoder to a set of subcarriers. The subcarrier mapper may correspond to SM 304A. The process proceeds to operation S808 where IDFT is performed on the output of the subcarrier mapper. The IDFT operation may be performed by IDFT 306A. The process proceeds to operation S810 where the output of the IDFT is transmitted over a wireless communication network as a DFT-s-OFDM signal.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method performed by at least one processor of a network node operating in a wireless communication network, the method including: receiving data associated with a plurality of users: performing, by a discrete Fourier transform (DFT) coder, a DFT transformation on the data associated with the plurality of users: performing, on the output of the DFT coder by a subcarrier mapper, subcarrier mapping that maps the output of the DFT coder to a set of subcarriers: performing an inverse DFT (IDFT) on the output of the subcarrier mapper; and transmitting, over the wireless communication network, the output of the IDFT as a DFT spread optical frequency division multiplexing (DFT-s-OFDM) signal.

(2) The method according to feature (1), in which the DFT coder maps the data associated with the plurality of users to a plurality of DFT inputs corresponding to a DFT-s-OFDM block.

(3) The method according to feature (2), in which the DFT coder maps the data associated with the plurality of users such that data of each user is mapped to a contiguous set of DFT inputs of the plurality of DFT inputs.

(4) The method according to feature (2), in which the DFT coder maps the data associated with the plurality of users such that data of each user is mapped to a non-contiguous set of DFT inputs of the plurality of DFT inputs.

(5) The method according to feature (2), further comprising transmitting, over the wireless communication network, mapping information indicating a mapping of data of each user in the plurality of users to the plurality of DFT inputs.

(6) The method according to any one of features (1)-(5), further including: mapping, by the DFT coder, one or more control channel elements (CCEs) of a physical downlink control channel (PDCCH) to a plurality of DFT inputs corresponding to a DFT-s-OFDM block.

(7) The method according to feature (6), in which the one or more CCEs are contiguous resources.

(8) The method according to feature (6), in which the one or more CCEs are non-contiguous resources.

(9) A network node operating in a wireless communication network, the network node including at least one memory configured to store computer program code; and at least one processor configured to access said at least one memory and operate as instructed by said computer program code, said computer program code including: receiving code configured to cause the at least one processor to receive data associated with a plurality of users: first performing code configured to cause the at least one processor to perform, by a discrete Fourier transform (DFT) coder, a DFT transformation on the data associated with the plurality of users: second performing code configured to cause the at least one processor to perform, on the output of the DFT coder by a subcarrier mapper, subcarrier mapping that maps the output of the DFT coder to a set of subcarriers; third performing code configured to cause the at least one processor to perform an inverse DFT (IDFT) on the output of the subcarrier mapper: and transmitting code configured to cause the at least one processor to transmit, over the wireless communication network, the output of the IDFT as a DFT spread optical frequency division multiplexing (DFT-s-OFDM) signal.

(10) The network node according to feature (9), in which the DFT coder maps the data associated with the plurality of users to a plurality of DFT inputs corresponding to a DFT-s-OFDM block.

(11) The network node according to feature (10), in which the DFT coder maps the data associated with the plurality of users such that data of each user is mapped to a contiguous set of DFT inputs of the plurality of DFT inputs.

(12) The network node according to feature (10), in which the DFT coder maps the data associated with the plurality of users such that data of each user is mapped to a non-contiguous set of DFT inputs of the plurality of DFT inputs.

(13) The network node according to feature (10), in which said computer program code further includes transmitting code configured to cause the at least one processor transmit, over the wireless communication network, mapping information indicating a mapping of data of each user in the plurality of users to the plurality of DFT inputs.

(14) The network node according to any one of features (9)-(14), in which said computer program code further includes mapping code configured to cause the at least one processor to map, by the DFT coder, one or more control channel elements (CCEs) of a physical downlink control channel (PDCCH) to a plurality of DFT inputs corresponding to a DFT-s-OFDM block.

(15) The network node according to feature (14), in which the one or more CCEs are contiguous resources.

(16) The network node according to feature (14), in which the one or more CCEs are non-contiguous resources.

(17) A non-transitory computer readable medium having instructions stored therein, which when executed by a processor in a network node operating in a wireless communication network cause the network node to execute a method comprising: receiving data associated with a plurality of users: performing, by a discrete Fourier transform (DFT) coder, a DFT transformation on the data associated with the plurality of users: performing, on the output of the DFT coder by a subcarrier mapper, subcarrier mapping that maps the output of the DFT coder to a set of subcarriers: performing an inverse DFT (IDFT) on the output of the subcarrier mapper; and transmitting, over the wireless communication network, the output of the IDFT as a DFT spread optical frequency division multiplexing (DFT-s-OFDM) signal.

(18) The non-transitory computer readable medium according to feature (17), in which the DFT coder maps the data associated with the plurality of users to a plurality of DFT inputs corresponding to a DFT-s-OFDM block.

(19) The non-transitory computer readable medium according to feature (18), in which the DFT coder maps the data associated with the plurality of users such that data of each user is mapped to a contiguous set of DFT inputs of the plurality of DFT inputs.

(20) The non-transitory computer readable medium according to feature (19), in which the DFT coder maps the data associated with the plurality of users such that data of each user is mapped to a non-contiguous set of DFT inputs of the plurality of DFT inputs.

What is claimed is:

1. A method performed by at least one processor of a network node operating in a wireless communication network, the method comprising:
receiving data associated with a plurality of users;
performing, by a discrete Fourier transform (DFT) coder, a DFT transformation on the data associated with the plurality of users;
performing, on the output of the DFT coder by a subcarrier mapper, subcarrier mapping that maps the output of the DFT coder to a set of subcarriers;
performing an inverse DFT (IDFT) on the output of the subcarrier mapper;
adding a cyclic prefix (CP) to the output of the IDFT;
transmitting, over the wireless communication network, the output of the IDFT with the added CP as a DFT spread optical frequency division multiplexing (DFT-s-OFDM) signal; and
mapping, by the DFT coder, one or more control channel elements (CCEs) of a physical downlink control channel (PDCCH) to a plurality of DFT inputs corresponding to a DFT-s-OFDM block, wherein the CCEs comprise 72 resources divided equally over 3 DFT-s-OFDM symbols.

2. The method according to claim 1, wherein the DFT coder maps the data associated with the plurality of users to a plurality of DFT inputs corresponding to a DFT-s-OFDM block.

3. The method according to claim 2, wherein the DFT coder maps the data associated with the plurality of users such that data of each user is mapped to a contiguous set of DFT inputs of the plurality of DFT inputs.

4. The method according to claim 2, wherein the DFT coder maps the data associated with the plurality of users such that data of each user is mapped to a non-contiguous set of DFT inputs of the plurality of DFT inputs.

5. The method according to claim 2, further comprising transmitting, over the wireless communication network, mapping information indicating a mapping of data of each user in the plurality of users to the plurality of DFT inputs.

6. The method according to claim 1, wherein the one or more CCEs are contiguous resources.

7. The method according to claim 1, wherein the one or more CCEs are non-contiguous resources.

8. A network node operating in a wireless communication network, the network node comprising:
at least one memory configured to store computer program code; and
at least one processor configured to access said at least one memory and operate as instructed by said computer program code, said computer program code including:
receiving code configured to cause the at least one processor to receive data associated with a plurality of users;
first performing code configured to cause the at least one processor to perform, by a discrete Fourier transform (DFT) coder, a DFT transformation on the data associated with the plurality of users;

second performing code configured to cause the at least one processor to perform, on the output of the DFT coder by a subcarrier mapper, subcarrier mapping that maps the output of the DFT coder to a set of subcarriers;

third performing code configured to cause the at least one processor to perform an inverse DFT (IDFT) on the output of the subcarrier mapper;

fourth performing code configured to cause the at least one processor to perform an addition of a cyclic prefix (CP) to the output of the IDFT;

transmitting code configured to cause the at least one processor to transmit, over the wireless communication network, the output of the IDFT with the added CP as a DFT spread optical frequency division multiplexing (DFT-s-OFDM) signal; and mapping code configured to cause the at least one processor to map, by the DFT coder, one or more control channel elements (CCEs) of a physical downlink control channel (PDCCH) to a plurality of DFT inputs corresponding to a DFT-s-OFDM block, wherein the CCEs comprise 72 resources divided equally over 3 DFT-s-OFDM symbols.

9. The network node according to claim 8, wherein the DFT coder maps the data associated with the plurality of users to a plurality of DFT inputs corresponding to a DFT-s-OFDM block.

10. The network node according to claim 9, wherein the DFT coder maps the data associated with the plurality of users such that data of each user is mapped to a contiguous set of DFT inputs of the plurality of DFT inputs.

11. The network node according to claim 9, wherein the DFT coder maps the data associated with the plurality of users such that data of each user is mapped to a non-contiguous set of DFT inputs of the plurality of DFT inputs.

12. The network node according to claim 9, wherein said computer program code further includes transmitting code configured to cause the at least one processor transmit, over the wireless communication network, mapping information indicating a mapping of data of each user in the plurality of users to the plurality of DFT inputs.

13. The network node according to claim 8, wherein the one or more CCEs are contiguous resources.

14. The network node according to claim 8, wherein the one or more CCEs are non-contiguous resources.

15. A non-transitory computer readable medium having instructions stored therein, which when executed by a processor in a network node operating in a wireless communication network cause the network node to execute a method comprising:

receiving data associated with a plurality of users;

performing, by a discrete Fourier transform (DFT) coder, a DFT transformation on the data associated with the plurality of users;

performing, on the output of the DFT coder by a subcarrier mapper, subcarrier mapping that maps the output of the DFT coder to a set of subcarriers;

performing an inverse DFT (IDFT) on the output of the subcarrier mapper;

adding a cyclic prefix (CP) to the output of the IDFT;

transmitting, over the wireless communication network, the output of the IDFT with the added CP as a DFT spread optical frequency division multiplexing (DFT-s-OFDM) signal; and mapping, by the DFT coder, one or more control channel elements (CCEs) of a physical downlink control channel (PDCCH) to a plurality of DFT inputs corresponding to a DFT-s-OFDM block, wherein the CCEs comprise 72 resources divided equally over 3 DFT-s-OFDM symbols.

16. The non-transitory computer readable medium according to claim 15, wherein the DFT coder maps the data associated with the plurality of users to a plurality of DFT inputs corresponding to a DFT-s-OFDM block.

17. The non-transitory computer readable medium according to claim 16, wherein the DFT coder maps the data associated with the plurality of users such that data of each user is mapped to a contiguous set of DFT inputs of the plurality of DFT inputs.

18. The non-transitory computer readable medium according to claim 17, wherein the DFT coder maps the data associated with the plurality of users such that data of each user is mapped to a non-contiguous set of DFT inputs of the plurality of DFT inputs.

* * * * *